Figure 1:
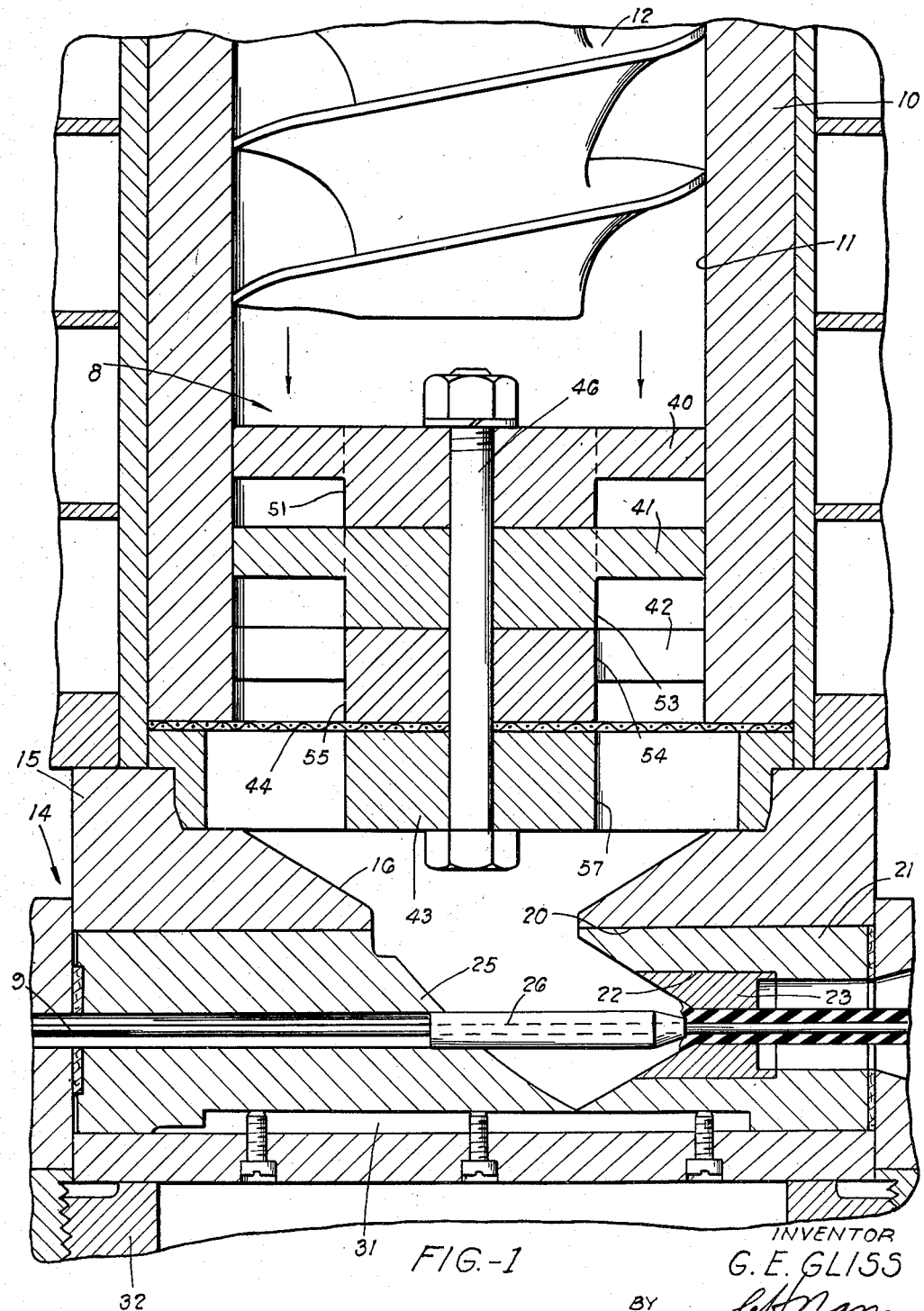

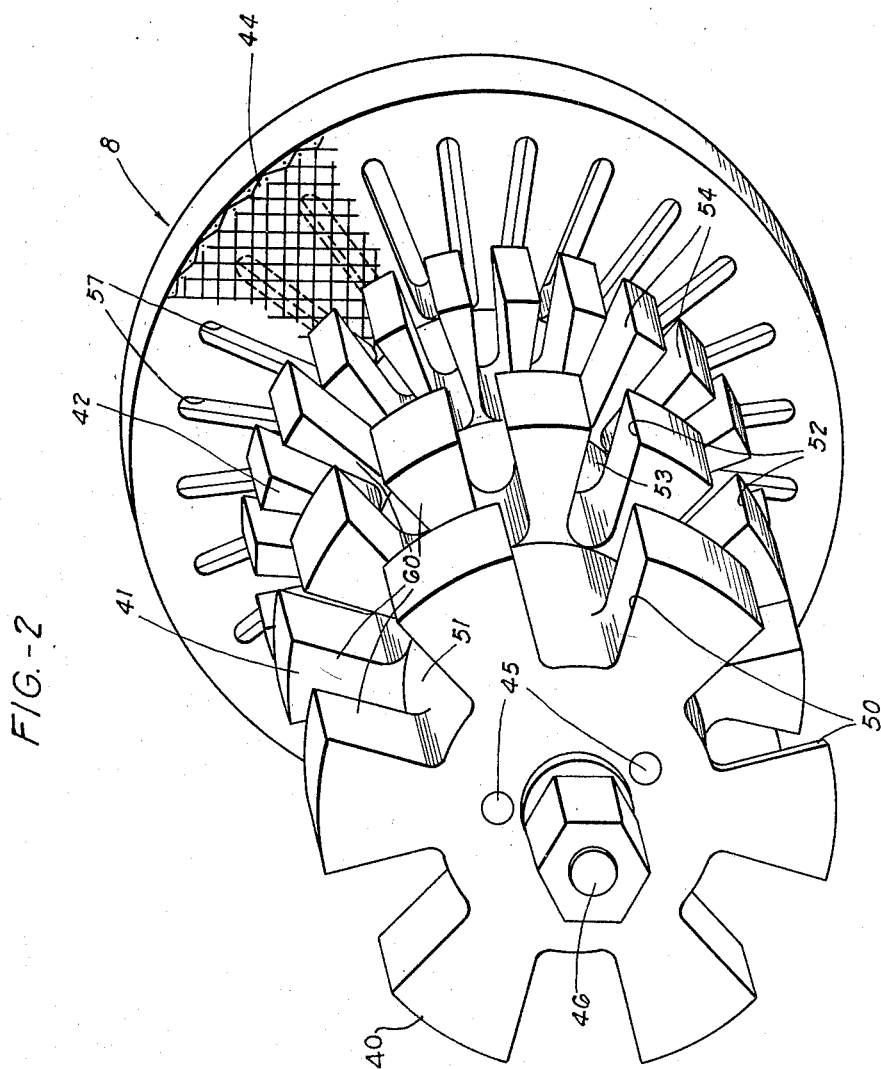

Patented Apr. 25, 1950

2,505,355

UNITED STATES PATENT OFFICE 2,505,355

APPARATUS FOR PLASTICIZING PLASTIC MATERIAL

George E. Gliss, Baltimore, Md., assignor to Western Electric Company, Incorporated, New York, N. Y., a corporation of New York Application August 30, 1946, Serial No. 693,856

2 Claims. (Cl. 18—12)

This invention relates to apparatus for plasticizing plastic material, and has for an object thereof the provision of new and improved apparatus for plasticizing plastic material.

A further object of the invention is to provide new and improved apparatus for thoroughly plasticizing and simultaneously extruding vulcanizable compounds upon conductors to form coverings thereover.

An extruder illustrative of the invention includes a conduit and means for forcing plastic material along the bore. A plurality of comb-like breaker plates, which are spaced apart from each other, are mounted in the exit end of the extrusion bore transversely to the axis of the bore. The breaker plates are provided with passages therethrough, and the passages in each of the breaker plates are staggered with respect to the passages in the adjacent breaker plates. The staggered passages form tortuous paths for the material which is forced therethrough. As the material is forced through the passages, it is thoroughly worked.

A complete understanding of the invention may be obtained from the following detailed description of a plasticizing apparatus forming a specific embodiment thereof, when read in conjunction with the appended drawings, in which:

Fig. 1 is a fragmentary, horizontal section of an extruder forming one embodiment of the invention, and Fig. 2 is a perspective view of a portion of the extruder.

Referring now in detail to the drawings, there is shown in Fig. 1 a plasticizing apparatus forming one embodiment of the invention, which includes a plasticizer 8. The apparatus is designed to apply a covering of plastic material, such as a vulcanizable compound including rubber or a synthetic rubber-like material, and a filler, such as zinc oxide or clay, upon a filamentary conductor 9, which may be bare or covered with a textile or plastic covering. The apparatus includes an extrusion cylinder 10 having a cylindrical extrusion bore 11 formed therein in which an elongated plasticizing stock screw 12 is rotatably mounted. The stock screw is rotated by suitable driving means, such as an electric motor and a gear train (not shown), to force the plastic material through an extruding head 14 under high pressure, and the stock screw works the material as it forces the material along the extrusion bore.

The extruding head 14 includes a body member 15 having a tapered opening 16, which forms a continuation of the extrusion bore 11 and communicates with a bore 20 formed in the extruding head transversely of the tapered opening 16. An annular die holder 21 is positioned in the exit end of the bore 20 and has a counterbore 22 formed therein in which a forming die 23 is mounted. The conductor 9 is advanced toward the right, as viewed in Fig. 1, by suitable core-advancing means, such as a capstan (not shown), through a core tube holder 25 and a core tube 26, which is held by the core tube holder. The core tube holder is provided with an inclined concave surface 27 for deflecting the plastic material toward the die 23, and an aligning plate 31 maintains the die holder 21 and the core tube holder 25, and thereby the die 23 and the core tube 26, centered relative to each other in the bore 20 in the extruding head 14, and a retaining nut 32 holds these elements in place in the extruding head.

The plasticizer 8 is mounted in the exit end of the extrusion bore 11 in the extrusion cylinder 10, and includes breaker plates 40, 41 and 42. A backing plate 43 supports a straining screen 44. The breaker plates 40, 41 and 42 are comb-shaped and are oriented with respect to each other by aligning pins 45—45. The breaker plates 40, 41 and 42 and the backing plate 43 are held together by a bolt 46.

The breaker plate 40 is provided with a plurality of large passages 50—50 spaced symmetrically therearound, and also includes a boss 51, which spaces the slotted portion thereof from the plate 41. The breaker plate 41 includes a plurality of medium sized passages 52—52, which are smaller than the passages 50—50 in the plate 40 and are staggered with respect thereto. The breaker plate 41 is also provided with a boss 53 for spacing the slotted portion thereof from the breaker plate 42. The plate 42 has a plurality of small passages 54—54 formed therein, which are staggered with respect to the passages 52—52 and are smaller than the passages 52—52. The plate 42 also includes a boss 55 for spacing the slotted portion thereof from the screen 44. The backing plate 43 is provided with a plurality of passages 57—57.

In the operation of the apparatus described hereinabove, plastic material, such as a vulcanizable compound containing rubber or a synthetic rubber-like material, is fed into the apparatus at a relatively low temperature, for example about room temperature. The plastic material is forced in the direction of the arrows in Fig. 1, through the extrusion bore 11 by the extrusion stock screw 12. The material is forced in streams through the passages 50—50 in the breaker plate 40, and then each of the streams from each of the passages 50—50 divides and flows through the smaller passages 52—52 in the breaker plate 41. The streams of material flowing through the passages 52—52 in the plate 41 then divide and flow through the even smaller passages 54—54 in the breaker plate 42. The streams flowing through the passages 54—54 flow through the screen 44 and the passages 57—57 in the backing plate 43. The plastic material flowing through the plasticizer 8 thus follows very tortuous paths and is divided often so that thorough mixing and working of the material is accomplished. The breaker plates 40, 41 and 42 have square corners 60—60 forming the edges of passages 50—50, 52—52 and 54—54, which square corners tend to make the flow of material more turbulent and thereby aid in working the material.

After the material has been thoroughly worked by passing through the plasticizer 8, the screen 44 and the backing plate 43, it flows through the tapered opening 16 in the extrusion head 15, and is formed into a covering over the conductor 9 by the die 23. Since the material has been thoroughly plasticized, its extrudability is high.

The plasticizer 8 serves to thoroughly plasticize the plastic material so that it may be easily extruded and also mixes the material completely as the material is forced therethrough. The plasticizer 8 substantially reduces the labor and equipment formerly required to separately plasticize and mix the material prior to introducing it into the extruder. This effects a large saving in the cost of covering conductors.

What is claimed is:

1. An apparatus for plasticizing plastic material, which comprises a conduit, a stock screw mounted rotatably in the conduit for forcing plastic material therethrough, a plate having a plurality of radial slots of a predetermined size formed therein positioned adjacent to the end of the stock screw, said plate also being provided with a boss extending away from the stock screw, a second plate having a plurality of radial slots smaller than the first-mentioned slots formed therein and being positioned in abutment with the boss of the first-mentioned plate, said second plate having a boss extending away from the first-mentioned plate, a third plate having a plurality of radial slots smaller than the slots in the second plate formed therein and being positioned in abutment with the boss on the second plate, said third plate also being provided with a boss extending away from the second plate, a strainer including a straining screen and a backing plate positioned in abutment with the boss on the third plate, means for securing all of said plates in said positions, and means for orienting said plates so that the slots in the second plate are staggered with respect to the slots in the first plate and the slots in the third plate are staggered with respect to the slots in the second plate, whereby material forced through the slots in the plates is divided and subdivided into a plurality of streams.

2. An apparatus for plasticizing plastic material, which comprises a conduit having a discharge end, a stock screw for forcing plastic material through the conduit, a series of plates having radial slots therein and spacing bosses thereon mounted in the discharge end of the conduit, said slots in the plates being progressively smaller from the plate most remote from the discharge end of the conduit to the plate nearest that end of the conduit, means for securing together the plates in abutting positions in which the plates are spaced one from another by the bosses and the slots in each of the plates are staggered with respect to the slots in each plate immediately adjacent thereto, a backing plate mounted at the boss on the end plate nearest the discharge end of the conduit, and a straining screen mounted on the backing plate between the backing plate and the last-mentioned boss.

GEORGE E. GLISS.

REFERENCES CITED

The following references are of record in the file of this patent:

UNITED STATES PATENTS

| Number | Name | Date |
|---|---|---|
| 2,262,989 | Conklin | Nov. 18, 1941 |
| 2,291,212 | Clinefelter | July 28, 1942 |

FOREIGN PATENTS

| Number | Country | Date |
|---|---|---|
| 269,761 | Great Britain | Apr. 28, 1927 |
| 451,466 | Germany | Nov. 1, 1927 |